(12) United States Patent
Hester

(10) Patent No.: US 11,529,932 B2
(45) Date of Patent: Dec. 20, 2022

(54) SELF-CONTAINED CAMERA WASH SYSTEM AND METHOD

(71) Applicant: DLHBOWLES, INC., Canton, OH (US)

(72) Inventor: Russell Hester, Odenton, MD (US)

(73) Assignee: DLHBOWLES, INC., Canton, OH (US)

( * ) Notice: Subject to any disclaimer, the term of this patent is extended or adjusted under 35 U.S.C. 154(b) by 19 days.

(21) Appl. No.: 16/320,139

(22) PCT Filed: Jul. 28, 2017

(86) PCT No.: PCT/US2017/044506
§ 371 (c)(1),
(2) Date: Jan. 24, 2019

(87) PCT Pub. No.: WO2018/023067
PCT Pub. Date: Feb. 1, 2018

(65) Prior Publication Data
US 2019/0270433 A1    Sep. 5, 2019

Related U.S. Application Data

(60) Provisional application No. 62/368,074, filed on Jul. 28, 2016.

(51) Int. Cl.
*B60S 1/02* (2006.01)
*B60S 1/56* (2006.01)
(Continued)

(52) U.S. Cl.
CPC .............. *B60S 1/56* (2013.01); *B08B 3/024* (2013.01); *B60S 1/50* (2013.01); *B60S 1/52* (2013.01);
(Continued)

(58) Field of Classification Search
None
See application file for complete search history.

(56) References Cited

U.S. PATENT DOCUMENTS 7,267,290 B2    9/2007    Gopalan
2012/0000024 A1*  1/2012    Layton ................. H04N 5/225
15/97.1
(Continued)

FOREIGN PATENT DOCUMENTS

CN        203955581 U        11/2014
CN        205113715 U    *    3/2016
WO    WO2016025930            2/2016

OTHER PUBLICATIONS

Patent Cooperation Treaty (PCT), International Search Report and Written Opinion for Application PCT/US2017/044506 filed Jul. 28, 2017, dated Nov. 9, 2017, International Searching Authority, US.

*Primary Examiner* — Mikhail Kornakov
*Assistant Examiner* — Richard Z. Zhang
(74) *Attorney, Agent, or Firm* — McDonald Hopkins LLC

(57) ABSTRACT

A self-contained, compact camera wash system 1000 for a drone 800 or as an automotive aftermarket kit 1101 uses a pressurized container 1002 similar to a common aerosol can to supply washer fluid to a washer nozzle 1020 via actuable valving. The fluid supply container is small for use with drone cameras (e.g., ~15 ml in volume) and is readily packaged in a compact assembly. For the automotive aftermarket kit 1101 a larger volume container volume is provided and configured to be easily replaced as needed.

12 Claims, 10 Drawing Sheets

(51) Int. Cl.
*B08B 3/02* (2006.01)
*B60S 1/50* (2006.01)
*B60S 1/52* (2006.01)
*B60R 11/04* (2006.01)

(52) U.S. Cl.
CPC ............... *B08B 3/02* (2013.01); *B60R 11/04* (2013.01); *B60Y 2200/10* (2013.01); *B60Y 2200/52* (2013.01)

(56) References Cited

U.S. PATENT DOCUMENTS

| | | | |
|---|---|---|---|
| 2014/0007909 A1* | 1/2014 | Manaois | B05B 7/267 |
| | | | 134/18 |
| 2014/0060582 A1 | 3/2014 | Hartranft | |
| 2015/0138357 A1* | 5/2015 | Romack | B60S 1/522 |
| | | | 348/148 |
| 2015/0185592 A1* | 7/2015 | Eineren | G02B 27/0006 |
| | | | 348/375 |
| 2015/0274294 A1* | 10/2015 | Dahlstrom | B05B 9/0403 |
| | | | 239/722 |
| 2015/0343999 A1 | 12/2015 | Lopez Galera et al. | |
| 2015/0353024 A1* | 12/2015 | Cooper | B60S 1/0848 |
| | | | 348/148 |
| 2016/0001330 A1 | 1/2016 | Romack et al. | |
| 2016/0082460 A1* | 3/2016 | McMaster | B05B 12/122 |
| | | | 701/2 |
| 2016/0291323 A1* | 10/2016 | Fishman | B60S 3/047 |
| 2017/0036647 A1 | 2/2017 | Zhao | |
| 2017/0036650 A1 | 2/2017 | Hester | |
| 2017/0129605 A1* | 5/2017 | Wu | B64D 1/18 |
| 2017/0200530 A1* | 7/2017 | Davis | H02G 1/02 |
| 2018/0272999 A1* | 9/2018 | Giraud | B60S 1/481 |

* cited by examiner

SELF-CONTAINED CAMERA WASH SYSTEM AND METHOD

CROSS REFERENCE TO RELATED APPLICATIONS

This application is a 35 U.S.C. 371 national stage filing of International Application No. PCT/US2017/044506 entitled "Self Contained Camera Wash System And Method," filed on Jul. 28, 2017 which claims priority to U.S. Provisional Application No. 62/368,074 entitled "Self Contained Camera Wash System And Method," filed Jul. 28, 2016, the disclosure in which are hereby incorporated by reference herein their entirety.

ADDITIONAL SUBJECT MATTER INCORPORATED BY REFERENCE

The subject matter disclosed and/or claimed in the following patent documents is incorporated by reference herein in its entirety:

U.S. Patent Application Pub. No. 2014/0060582 (Hartranft et al), published Mar. 6, 2014, and entitled "Integrated automotive system, nozzle assembly and remote control method for cleaning an image sensor's exterior or objective lens surface";

U.S. Patent Application Pub. No. 2015/0138357 (Romack et al), published May 21, 2015, and entitled "Integrated Automotive System, Pop Up Nozzle Assembly and Remote Control Method for Cleaning a Wide Angle Image Sensors Exterior Surface";

U.S. Patent Application Pub. No. 2016/0001330 (Romack et al), published Jan. 7, 2016 and entitled "Integrated Automotive System, Nozzle Assembly and Remote Control Method For Cleaning an Image Sensor's Exterior or Objective Lens Surface";

U.S. Patent Application Pub. No. 2017/0036650 (Hester et al), published Feb. 9, 2017, and entitled "Integrated Automotive System, Compact Low-Profile Nozzle Assembly and Compact Fluidic Circuit For Cleaning a Wide-Angle Image Sensor's Exterior Surface"

U.S. Patent Application Pub. No. 2017/0036647 (Zhao et al), published Feb. 9, 2017 and entitled "Integrated Multi Image Sensor and Lens Washing Nozzle Assembly and Method for Simultaneously Cleaning a Plurality of Image Sensors";

PCT Published Application No. WO2016025930 (Gopalan et al), published Feb. 18, 2016, entitled "Compact Split-Lip Shear Washer Nozzle"; and U.S. Pat. No. 7,267,290 (Gopalan et al), filed Nov. 1, 2004, issued Sep. 11, 2007.

BACKGROUND

Technical Field

The present invention pertains generally to lens cleaning systems and, more particularly, to such systems adapted for use with image sensors or cameras mounted for operation in environments in which the camera lens field of view may become impaired by solid or liquid matter adhering to the exposed lens surface.

Discussion of Background Art

Solid state image sensing technology provides small and inexpensive cameras and image sensors available for incorporation into a wide variety of vehicles, sports equipment and a wide variety of other items. For example, the small unmanned aircraft commonly referred to as "drones" often include one or more cameras. With drones becoming more prevalent, it is apparent that users and government regulators will need to address an increased need to have their cameras cleaned in order to ensure accurate image capture as well as proper control of the device for many reasons, including public safety.

Drones often operate in dusty or dirty environments, and the camera(s) mounted on drones used for navigation and image collection require cleaning. The physical requirements that control drone design do not allow for traditional automotive-style camera wash systems to be used in flight. There is a need, therefore, for a practical, inexpensive and unobtrusive system and method for a Drone operator to wash camera lenses during flight.

As a related issue, automotive camera wash systems have not been incorporated into all cars and other vehicles equipped with external (e.g., "back-up" or rear view) cameras, and the owners of those cars must regularly manually clean the camera lens surface. Cameras are intentionally designed to be unobtrusive, so many vehicle owners do not even know where to look for the camera. As a consequence, drivers may not clean the rear view camera lens, even when it becomes sufficiently soiled to significantly impair the field of view. There is a need, therefore, for a convenient, flexible, inexpensive and unobtrusive system and method for a driver to retrofit a camera lens cleaning system to vehicles that do not have factory installed camera wash systems.

OBJECTS AND SUMMARY OF THE INVENTION

It is an object of the present invention to overcome the above-mentioned issues and difficulties by providing a compact, economical and easily installed self-contained image sensor or camera wash system, readily configured in at least two embodiments or configurations.

A first embodiment of the self-contained image sensor or camera wash system of the invention is configured for use on a remotely controlled flying camera platform, i.e., a small unmanned aircraft system (sUAS) or drone, and includes a replaceable pressurized container of washer liquid (e.g., a common aerosol canister) for supplying pressurized washer fluid to a washer nozzle. Selective remote actuation of the canister to emit and cause the pressurized wash liquid to flow to the fluidic nozzle can be effected in any of several ways. For example, the means for actuation may be electromechanical in nature whereby the outlet tube of the canister is mechanically moved in response to a remotely transmitted and locally received electrical signal. Alternatively, the remotely generated signal may control an electromagnetic valve (or solenoid) that selectively permits outflow of the pressurized fluid from the container or canister. The remotely actuable solenoid valve may be of the type that is located within an aerosol canister for controllably dispensing a liquid spray, or the solenoid valve or other control means may be disposed external to the canister and arranged to controllably dispense liquid therefrom. Actuation of the liquid dispenser may be randomly selected or automatic as to times of occurrence and/or the duration of each spray actuation. The fluid supply container or canister is sufficiently small and lightweight to permit on board use with cameras on drones where weight and space considerations are paramount, and easily packaged in a unitary, compact assembly. Alternatively, the drone mounted self-contained camera wash system nozzle can be connected via flexible conduits or tubes to be mounted remotely from the fluid supply container assembly to: (a) provide greater flexibility in incorporating a plurality of cameras at different locations, and (b) distribute weight on the drone airframe advantageously.

The washer nozzle is preferably of the fluidic spray nozzle type that issues a laterally oscillating jet of washer liquid which, by virtue of its oscillation, breaks up into a pattern of droplets that uniformly and efficiently strike and cover the target area, in this case an image sensor or camera lens. The uniformity of droplet coverage permits less fluid to be used per individual lens cleaning event than is required with other types of nozzles, which, in turn, reduces the amount of liquid that must be stored in the on board container to permit a practically reasonable number of cleaning events to be effected per drone flight. As a result, the size and weight requirements for the washer fluid container are reduced. Many fluidic spray nozzles for this purpose can be used, with some particularly well-suited examples disclosed in U.S. Pat. No. 7,267,290 (Gopalan et al) and PCT Published Application No. WO2016025930 (Bowles), both incorporated by reference herein above.

The drone-mounted self-contained image sensor or camera wash system is preferably activated wirelessly from a trigger/switch attached to or incorporated in the drone operator's hand-held controller, PDA, tablet or laptop computer used to operate the drone. An advantage of the self-contained camera wash system of the present invention is that, for drones of small size and light weight, an on command cleaning method is made available and can be effected at any time in flight, e.g., as the drone is viewing or finding its way to its objective. A low voltage control signal is derived from the drone's onboard power supply and can be selectively applied to the solenoid to actuate the valve and thereby permit the pressurized washer fluid to be applied from the container to the spray nozzle. The pressurized container can be replaced easily as needed.

The drone-mounted image sensor or camera wash system may be factory installed on the drone or may be provided as a kit of components for aftermarket installation.

A second embodiment of the self-contained image sensor or camera wash system of the present invention is provided as a retrofit kit configured for the automotive aftermarket where the wash liquid container volume is not limited by the weight and space considerations necessary for drones. The larger container volume for this embodiment may be, for example, 750 ml. The self-contained and compact characteristics of the components render it easy to install, and the container can be readily replaced (if of the aerosol type) or replenished with wash liquid (if of a selectively pressurized type). The automotive retrofitted or aftermarket self-contained camera wash system washer may be activated wirelessly, preferably from a wireless (e.g., Bluetooth) trigger/switch controller mounted or otherwise located within a vehicle interior or crew compartment. The spray nozzle can be mounted remotely from the container to enable use for a wide range of camera locations.

Part or all of the self-contained camera wash system fluid storage container and control hardware may be incorporated into a unitary one piece enclosure or housing adapted for installation upon an automobile and included in a kit with fasteners configured to detachably attach the housing to and behind the automobile license plate mount. This provides a visually inconspicuous housing with a protected internal volume mounted behind or beneath the license plate, effectively spacing the license plate away from the vehicle by a few centimeters. This behind the license plate housing, for certain car models, provides advantageous positioning of the nozzle since the factory provided rear view camera is often placed near the automobile license plate mount. Energy to operate the control signal receiving and processing circuitry, the solenoid valve or other actuator and related control electronics may be provided from an included battery or from a generic power source such as the vehicle battery. The automotive aftermarket self-contained camera wash system components can be incorporated into a single unitary housing or enclosure, or the nozzle can be connected via flexible conduits or tubes to permit mounting remotely from the fluid supply reservoir assembly to provide greater flexibility in incorporating different numbers and locations of cameras to be treated.

An advantage for the automotive aftermarket embodiment of self-contained image sensor or camera wash system is that, rather than tapping into a pre-existing automotive washer system hose and pump, the vehicle driver or user can more simply mount this system with nothing more than a physical (i.e., mechanical) connection to the vehicle. Optionally, a connection to the existing electrical wiring in the vehicle may be provided for some models; e.g., the power may be provided by the connections supplying the reverse camera, and the wash control signal may be synchronized with an actuation signal provided to the reverse camera.

The above and still further features and advantages of the present invention will become apparent upon consideration of the definitions, descriptions and descriptive figures of specific embodiments thereof set forth herein. In the detailed description below, like reference numerals in the various figures are utilized to designate like components and elements, and like terms are used to refer to similar or corresponding elements in the several embodiments. While these descriptions go into specific details of the invention, it should be understood that variations may and do exist and would be apparent to those skilled in the art in view of the following description.

DESCRIPTION OF THE PREFERRED EMBODIMENTS

Figure 1:
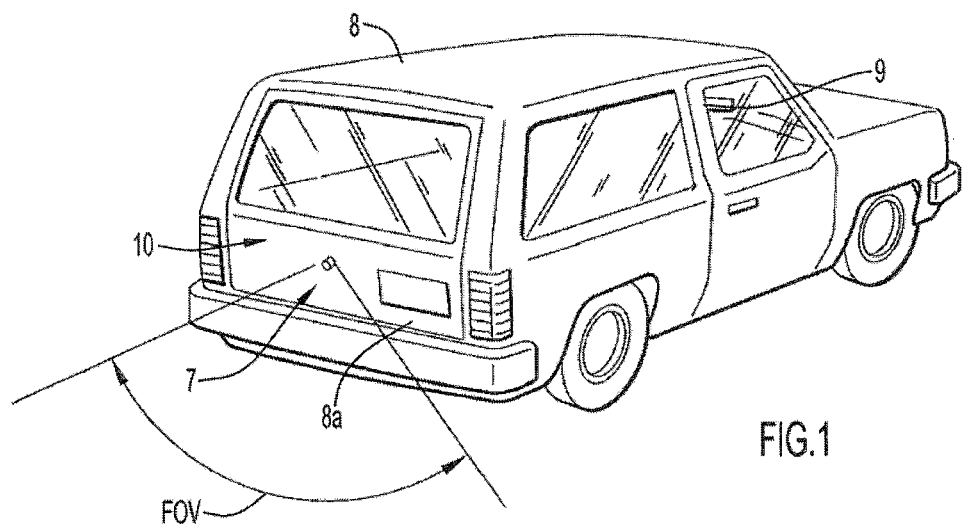
FIG. 1 is a rear perspective view of a vehicle having a rear view imaging system or back-up camera of the type having a lens that may be cleaned in accordance with the present invention.

Referring to FIG. 1, an image capture system or image sensor or camera 7 is positioned at a vehicle 8, such as at a rearward exterior portion 8a of the vehicle. Camera 7 is operable to capture an image of a scene occurring rearwardly of the vehicle, and to display the image at a display 9 which is viewable by a driver or occupant of the vehicle. It is with a camera such as camera 7, for example, that the self-contained vehicle camera wash system of the present invention is designed to function. Specifically, during normal driving conditions the lens of camera 7 is subject to field of view impairment by dirt, debris, snow, ice, etc., contacting and agglomerating thereon.

Figure 2:
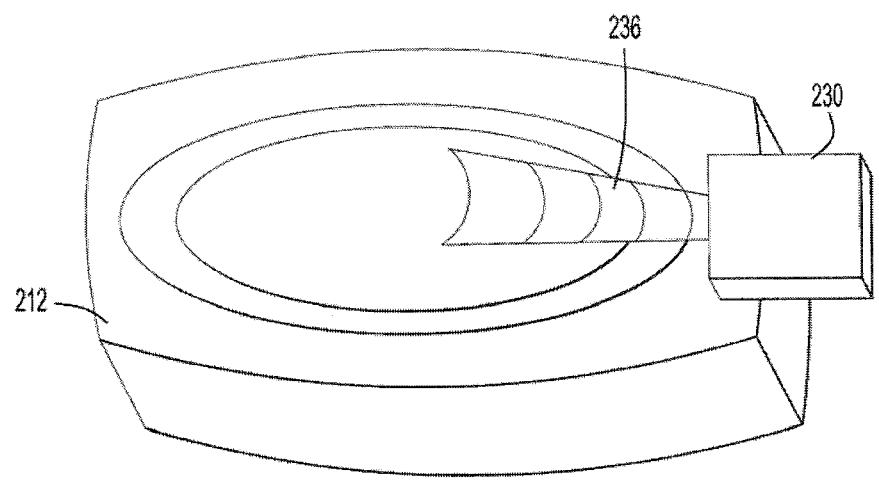
FIG. 2 is a schematic diagram illustrating a perspective view of a fluid spray pattern emitted by a fluidic nozzle for cleaning an imaging system exterior objective lens surface with the present invention
Figure 3:
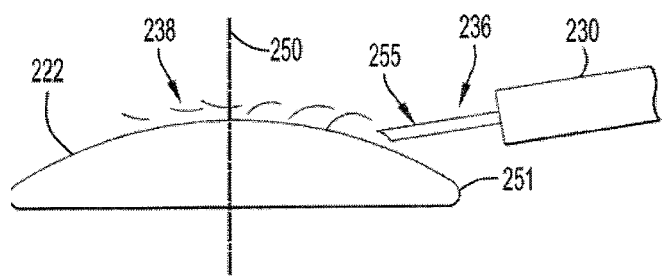
FIG. 3 is a schematic side view of the spray pattern and nozzle of FIG. 2.

Referring to FIGS. 2 and 3, as described in greater detail in the above-referenced U.S. Pub. No. US2016/0001330 (Romack et al), the lens 222 of a camera 212, positioned similarly to camera 7 of FIG. 1, may be selectively or periodically cleaned by means of a fluidic oscillator nozzle such as nozzle 230, for example of the type illustrated in FIGS. 7 and 8 and described in structural detail hereinbelow. Specifically, nozzle 230, which is aimed at the surface of lens 222 transversely of the lens field of view, issues a liquid jet that rapidly oscillates transversely of the flow direction within a predetermined fan angle pattern 236, causing the jet to break up into large droplets that impact and efficiently wet the surface of the lens. The preferred spray flow rate is approximately 200 ml/min per nozzle at a fluid pressure of 18 psi, and the spray plane thickness 255 (i.e., the thickness of the spray plane as shown in FIG. 3) is preferably approximately 2°. The resulting kinetic impact effect across the surface of lens 222 drives debris therefrom as part of the laterally flowing effluent 238.

Because of the efficient wetting afforded by the droplet spray patent of a fluidic oscillator spray nozzle, it is ideally suited to the uses of the present invention described hereinbelow where size and weight constraints apply and minimization of washer fluid usage is desirable. That is not to preclude use of other nozzles, however, where such constraints do not apply. For example, laterally offset washing nozzle 230 may be a non-oscillating shear nozzle configured to generate a substantially flat fan spray having a selected spray fan angle, for example, 45° or other angle selected in the range of 15° to 120°. Alternatively, the washing nozzle may be a non-oscillating BugEye nozzle configured to generate at least one substantially solid fluid jet (i.e., a substantially solid fluid stream having no fan angle).

Figure 4:
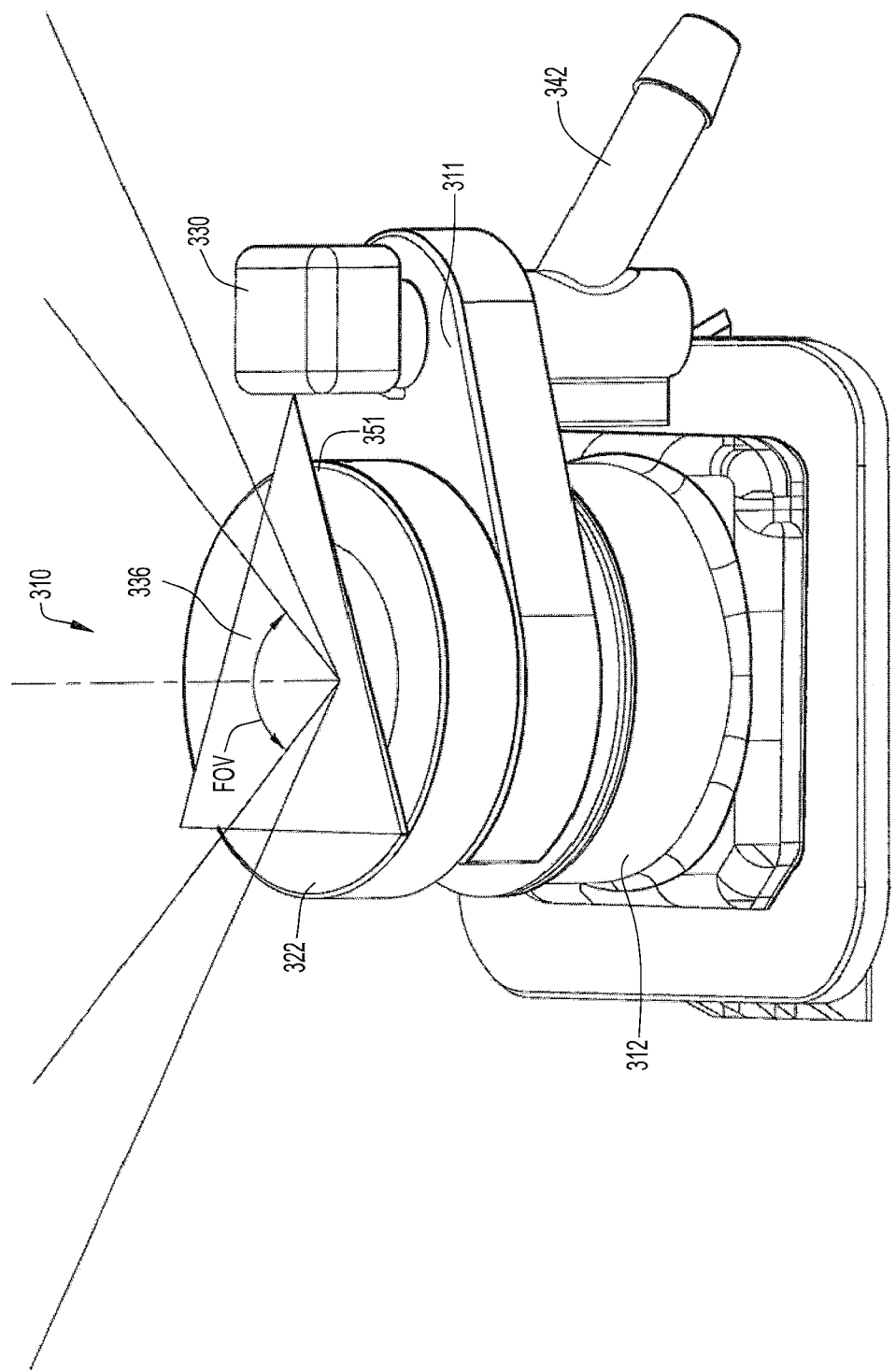
FIG. 4 is a perspective view illustrating the spray pattern orientation from a fluidic nozzle assembly configured for cleaning the objective lens surface of a camera in accordance with the present invention.
Figure 5:
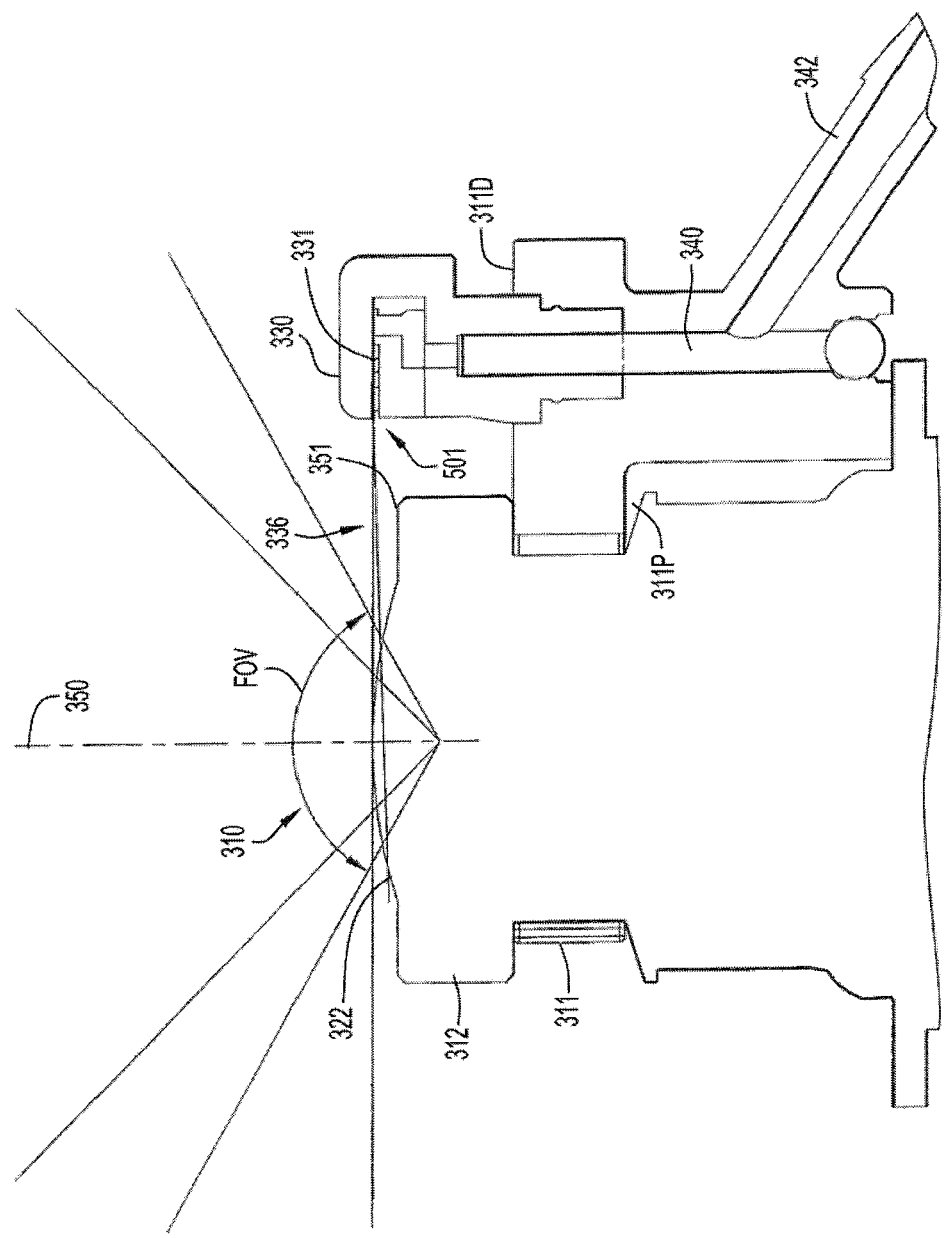
FIG. 5 is a side view of the nozzle and lens surface of FIG. 4 illustrating the spray pattern incidence angle at the surface of the lens.
Figure 6:
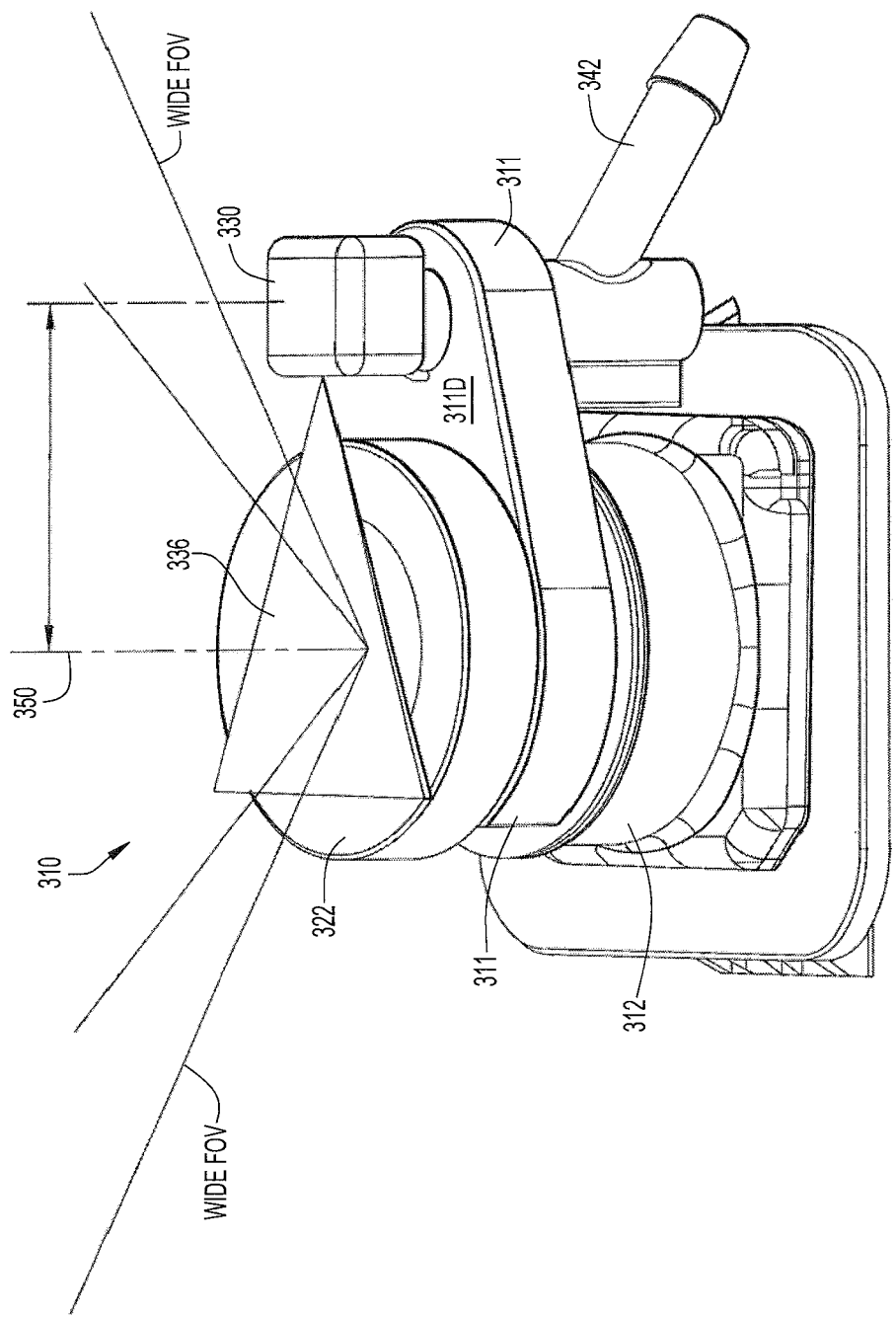
FIG. 6 is a perspective view illustrating range of the spray pattern in FIGS. 4 and 5.
Figure 9:
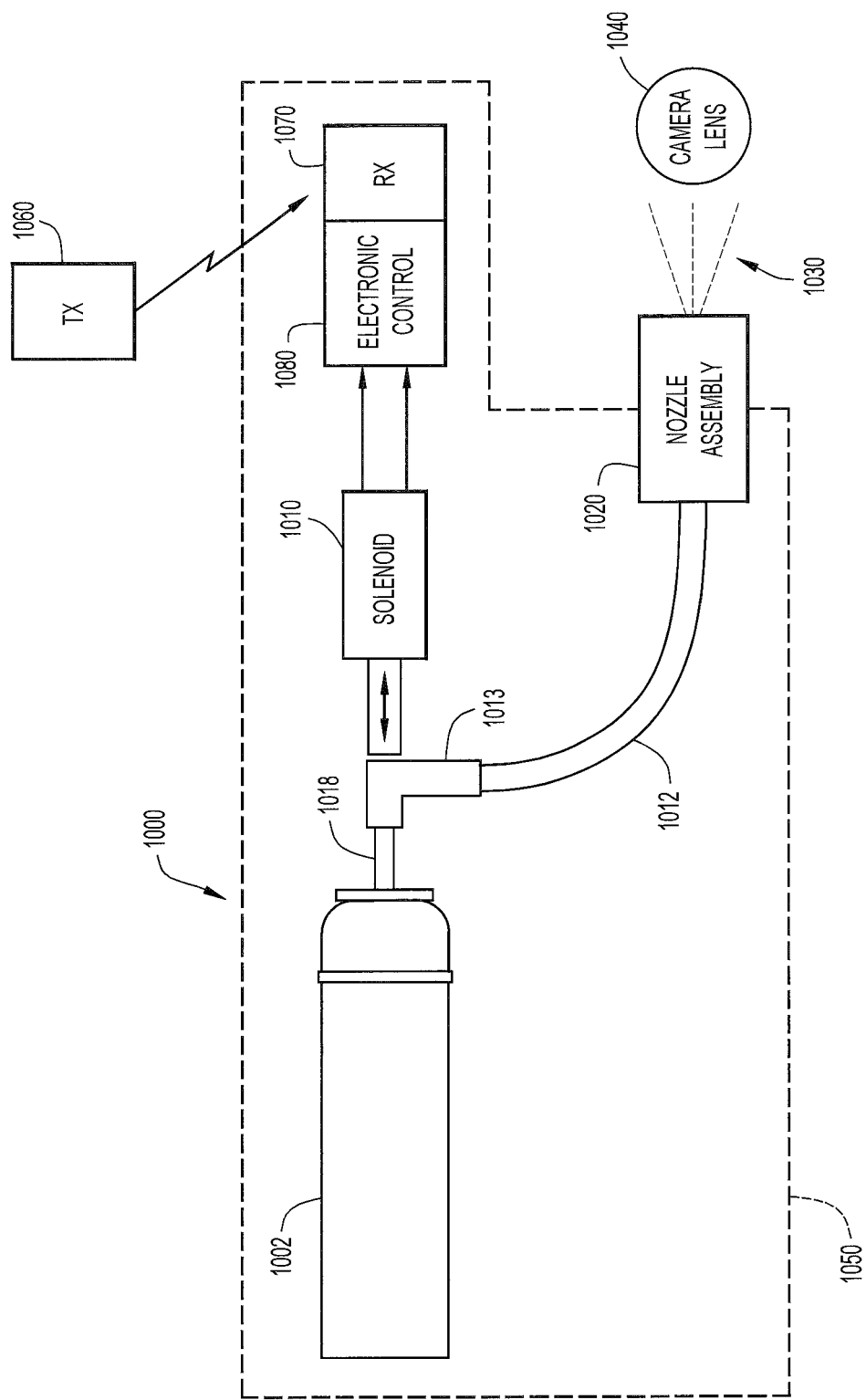
FIG. 9 is a schematic representation of an embodiment the self-contained vehicle image sensor or camera wash system of the present invention.
Figure 10:
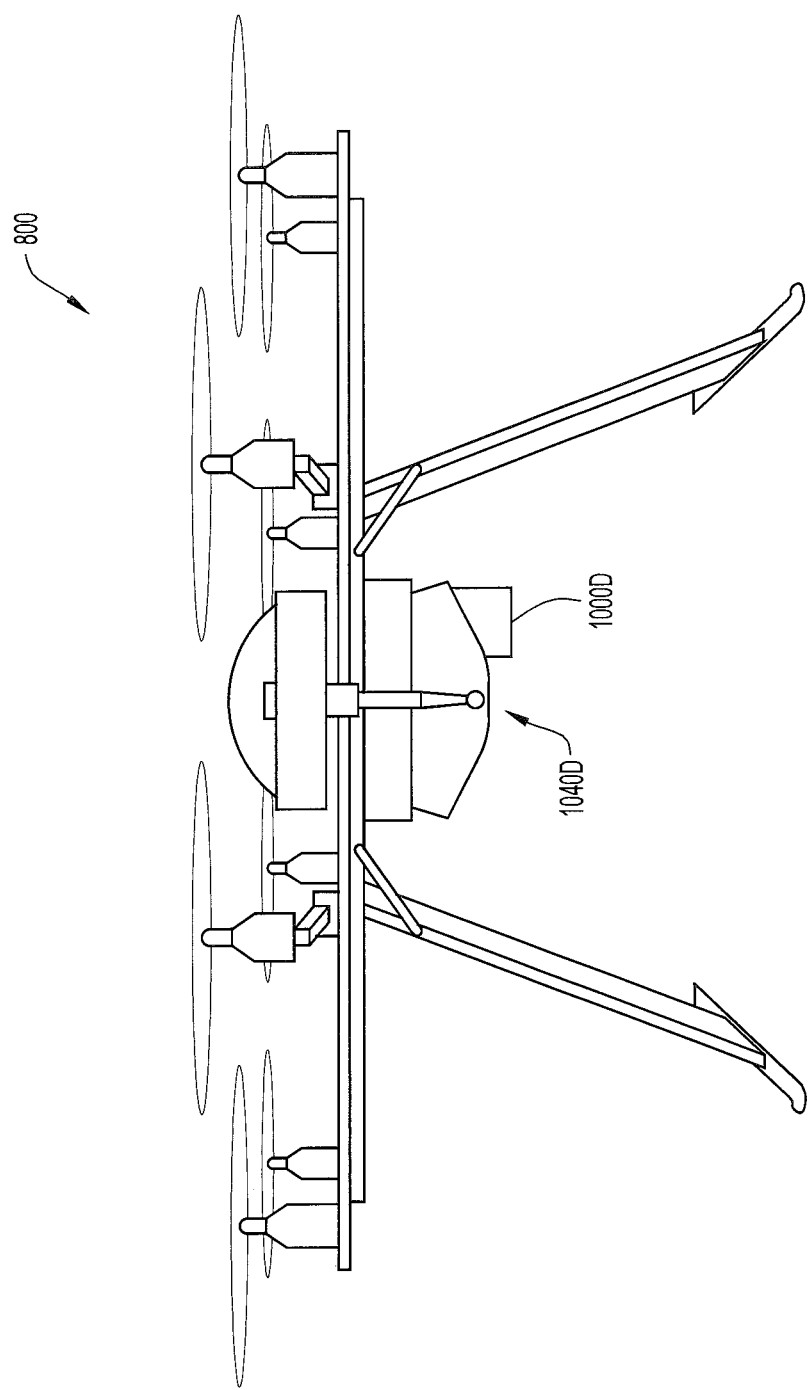
FIG. 10 is a diagrammatic representation of the use of the self-contained vehicle image sensor or camera wash system of the present invention used with a drone.
Figure 11:
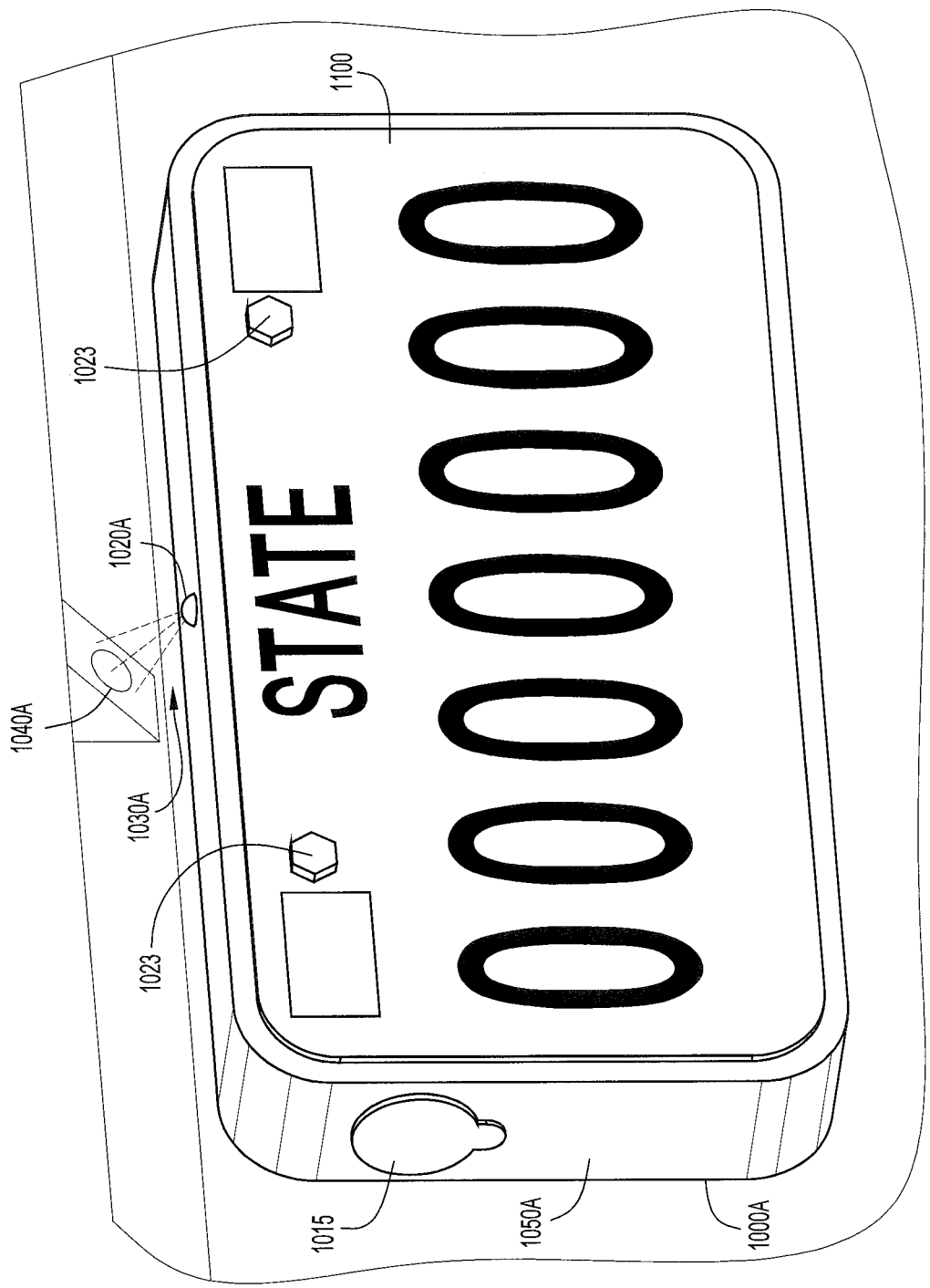
FIG. 11 is a diagrammatic representation in perspective of the self-contained vehicle image sensor or camera wash system of the present invention mounted on the rear side of a license plate of an automobile.

Turning now to FIGS. 4-6, which correspond to FIGS. 9-11 in above referenced 2016/0001330 (Romack et al), an external lens washing system is illustrated to exemplarize mounting and operational considerations for fluidic washer nozzles of the general type illustrated in FIGS. 2 and 3. As illustrated in FIG. 4, external lens washing system 310 includes a substantially rigid aiming bracket or fixture 311 having a distal side 311D and a proximal side 311P (best seen in the cross section view of FIG. 5). Fixture or bracket 311 is a rigid durable support fabricated and configured to support camera module 312 and thus orients and constrains the camera external lens which is exposed toward the distal side of assembly 310. The camera lens has an external lens surface 322 with a lens perimeter and a lens central axis 350 projecting distally from the lens surface 322, and the lens field of view is defined as a distally projecting solid angle (e.g., a truncated cone or pyramid, generating an image signal). The Field of View ("FOV") typically has an angular width of 90° to 170. The camera or image sensor 312 has a lens central axis 350 centered within the lens perimeter and the lens FOV is typically symmetrical about lens central axis 350.

Washing system 310 includes at least a first nozzle assembly 330 configured to be supported and aimed toward the external lens 322 by the aiming fixture 311, and the first nozzle assembly includes a fluid inlet 342 in fluid communication with first laterally offset washing nozzle 330 which projects above or distally from the aiming fixture's distal side 311D. Laterally offset nozzle 330 is configured and aimed to spray washing fluid in a substantially planar sheet 336 having a selected thickness (e.g., 255) toward external lens surface 322 and across the field of view, spraying at a first selected spray aiming angle (i.e., preferably spraying in a plane inclined proximally at an angle) of about 1°. The selected aiming angle can be in a range between 1° and 20°, (as best seen in FIG. 5) relative to a plane tangent to the lens external surface 322. Nozzle 330 is oriented to spray from a selected side, meaning that it is aimed to spray along a first selected spray azimuth angle in relation to a selected fixed reference point or datum 351 on the lens perimeter.

Figure 7:
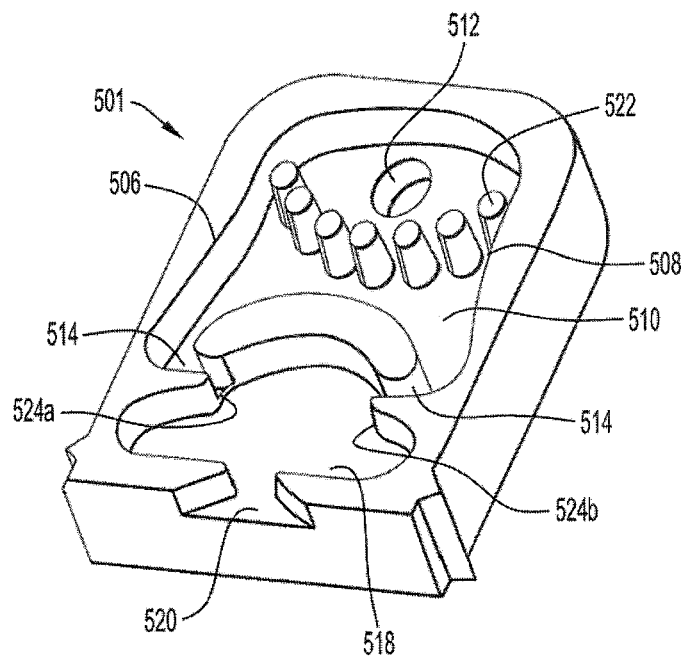
FIG. 7 is a perspective view illustrating an example of a fluidic oscillator for use as the spray nozzle employed for the camera lens cleaning system of the present invention.
Figure 8:
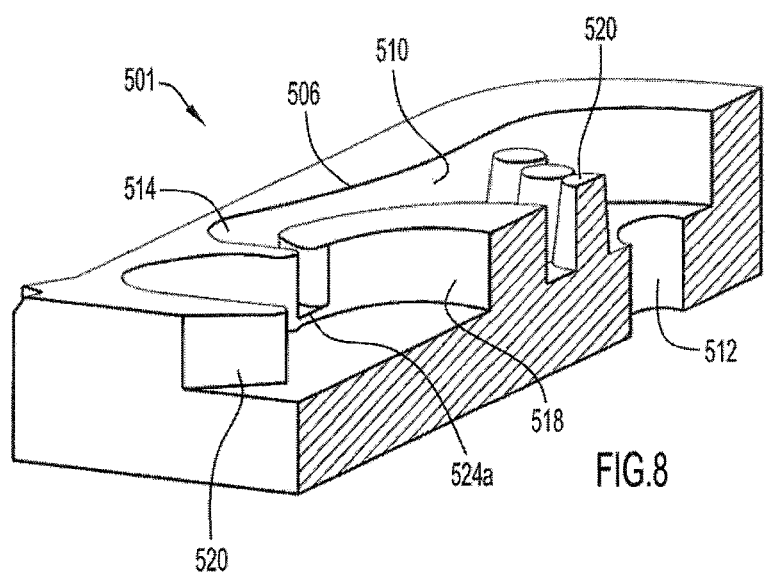
FIG. 8 is a perspective view in section of the fluidic oscillator of FIG. 7.

Preferably, lens washing nozzle 330 includes a fluidic oscillator interaction chamber 331 configured to operate on a selectively actuated flow of pressurized washing fluid flowing through the oscillator chamber 331 to generate an exhaust flow of fluid droplets 336. The nozzle assembly's fluid inlet 342 receives pressurized washer fluid from a reservoir 290 and is in fluid communication via fluid path 340 which passes the pressurized washer fluid distally to the laterally offset outlet nozzle 330. The nozzle is configured to exhaust the washer fluid from interaction chamber 331 and generate an oscillating spray of fluid droplets 336 aimed toward the external lens surface 322 across its field of view. The fluidic oscillator may be configured as a stepped mushroom fluidic oscillator (as illustrated in FIGS. 7 and 8). The flow rate in oscillating spray 336 is preferably approximately 200 ml/min per nozzle at 18 psi, and the spray thickness (i.e., which is seen as thickness in the spray plane transverse to the spray's fan angle plane, as shown in FIG. 5) is preferably approximately 2°. The oscillating action and large drops generated by the fluidic oscillator aimed by nozzle 330 in this manner effectively wets lens surface 322 very rapidly and provides a kinetic impact effect which impacts, dissolves and drive debris (not shown, but like debris 223) as part of a flowing effluent laterally off lens surface 222.

Optionally, laterally offset washing nozzle 330 may be configured as a non-oscillating shear nozzle configured to generate a substantially flat fan spray having a selected spray fan angle (e.g., 45° or another angle selected in the range of 15° to 120°). Alternatively, the laterally offset washing nozzle may be configured as a non-oscillating bug-eye nozzle configured to generate at least one substantially solid fluid jet (i.e., a substantially solid fluid stream having no fan angle).

Preferably, the laterally offset washing nozzle 330 is configured to aim the spray 336 from a selected lateral offset distance (from the nozzle's throat or outlet to the center of objective lens external surface 222) of about 15 mm. The selected lateral offset distance is preferably within the range bounded by 10 mm and 30 mm, in order to keep the entire package as compact as possible.

There are several variables to consider when designing for this camera cleaning system and package, including: mounting methods, packaging space, Field of View (FOV) considerations and Adverse System Effect Mitigation. The most preferred mounting or attachment method for the nozzle 330 with the camera 312 is on the camera module housing or body, directly. This mounting location assures that no matter where the camera moves, fluid sprayed from the nozzle is always aimed at the right location toward the center of the lens surface. It is of course, understood that there will be some camera designs that do not allow for direct attachment of the nozzle and will require separate mounting schemes. The basics of good nozzle placement discussed above are the same regardless of attachment method.

In general, the location of cameras (e.g., 312) in vehicles is limited to certain specific regions, due to packaging and line-of-sight objectives. Unfortunately for camera wash nozzle packaging, prime vehicle panel exterior locations also tend to be good for other components like; lift gate handles or lighting components. As a result, these vehicle panel exterior locations have very tight packaging constraints, driving the need for very small nozzles and tight camera-to-nozzle envelopes.

It should be understood that many existing cameras have Field of View Angles from 120° to 170° (e.g., as indicated by radial lines in FIGS. 4-6). A major constraint to system functionality is to have nothing intrude into the displayed field of view of the camera, so that the user is not distracted by the appearance of the lens washing nozzle 330. Thus the nozzle (e.g., 230 or 330) should be laterally positioned such that it is not in the camera FOV. In this regard nozzle 230 or 330 may be oriented and aimed from a fixed nearly parallel-to-lens location, to be away from and behind the FOV of the camera. As the camera FOV approaches and exceeds 180° this will become impossible. However, it will be noted that with these large angles other components in the vehicle will become visible to the camera. It will then be necessary to place the nozzle such that it is aligned with the vehicle's other features and is thereby not silhouetted beyond the vehicle's exterior surface features, minimizing intrusion into "clear" view of the camera. In the embodiment of FIGS. 4-6, nozzle 330 creates a fluid distribution such that the entirety, or as much as possible, of the lens is covered by fluid impacting the lens at −1° to −20° or so before the nozzle head becomes visible to the camera, ("aim angle"). Another significant advantage to nearly parallel impact of the spray 336 to the lens 322 is that the fluid is fully engaged in pushing the debris off or laterally across the lens, and not in obliquely impacting or bouncing off the lens as would be experienced in higher aim angles with a more direct impingement. As the aim angle increases, the nozzle must be moved distally further and up into the FOV, and farther from the camera, making cosmetically attractive packaging difficult. Therefore, the nozzle should be kept within 10° (aim angle down to the lens) to keep cosmetic packaging reasonable.

In addition to aim angle considerations, the nozzle distance from the center of the lens (as illustrated in FIG. 6) is important. The closer nozzle 330 is to the center of the lens 322, the wider the fluid distribution (and spray fan angle) must be to cover the entirety of the lens. Wider spray fan angles spread a relatively small fluid flow rate over a larger lens cleaning area, which could result in the need for a different distribution geometry or higher flow rates. The lateral offset distance may be between 18 mm and 28 mm, but it should be understood that this is not a limiting factor on use of the invention.

For reasons discussed herein it is desirable to minimize the flow rate and volume of fluid necessary to effect lens cleaning. A fluidic oscillator spray nozzle embodiment illustrated in FIGS. 7 and 8 functions with a flow rate of 200±40 mL/min @ 18 PSI and has proven to be very effective in cleaning a lens such as lens 322. This fluidic circuit 501 is capable of performing well in cold weather conditions with 0.06 mm step and allows for very small packaging at 5 mm×0.5 mm for a 200 mL/min flow rate and 50° spray fan angle for spray 336. Most importantly, this design can maintain a minimum 0.014" power nozzle dimension which is required for good clog resistant performance. Power nozzles smaller than this risk clogging in automotive situations. This fluidic oscillator has also been provided with internal filters (e.g., posts 522). Additionally, this oscillator design allows for a small interaction region 331 (FIG. 5), approximately 3.3 mm×2.5 mm, helping to support fan angles as high as 50° while still staying within a small packaging space.

The fluidic oscillator illustrated in FIGS. 7 and 8 is a stepped mushroom fluidic oscillator as described in U.S. Pat. No. 7,267,290, the entirety of which is incorporated herein by reference. This fluidic oscillator is optionally configured as a removable fluidic chip 501 having an oscillating chamber defined between the fluid impermeable surfaces of chip 501 and the nozzle assembly's chip-receiving interior surfaces (as seen in section in FIG. 5). The fluidic oscillator with interaction chamber 331 as configured in nozzle assembly 310 is suitable for use at colder temperatures for an exhaust flow in the form of oscillating spray of fluid droplets 336 and has a pair of power nozzles 514 configured to accelerate the movement of the pressurized fluid, a fluid pathway that connects and allows for the flow of pressurized fluid between its inlet 512 and the power nozzles 514, an interaction chamber 518 which is attached to the nozzles and receives the flow from the nozzles, a fluid spray outlet 520 from which the spray exhausts from the interaction chamber, and a flow instability generating structural feature for increasing the instability of the fluid flow from the power nozzles, with this structural feature being situated in a location chosen from the group consisting of a location within the fluid pathway or proximate the power nozzles. The flow instability generating feature preferably comprises a protrusion that extends inward from each sidewall 506 of the fluid pathway so as to cause a flow separation region downstream of the protrusions, but may comprise a step 524A in the height elevation of the floor of the power nozzles 514 with respect to that of the interaction chamber, as best seen in FIG. 8.

Referring to FIG. 9, in accordance with an aspect of the present invention, a self-contained vehicle image sensor or camera wash system 1000 is configured for installation in relation to the lens 1040 of an image sensor (e.g., LIDAR sensor) or camera that is to be periodically cleaned and that would typically be included as original equipment on a car truck, drone, or other vehicle. This system employs a number of features of the camera wash devices illustrated in FIGS. 2-8 but can provided in a smaller package suitable as a retrofit for cameras previously mounted as original equipment on drones and land vehicles. In this regard, system 1000 is typically provided as an aftermarket kit. The system utilizes a pressurized container 1002 of wash liquid, the container being a typical aerosol canister or other suitable container for storing and selectively delivering pressurized wash liquid. Container 1002, depending on the application of the system, holds a volume of liquid, typically anywhere in the range of 10 to 1,000 ml, at a pressure typically in the range from 5 to 80 psi. The pressurized wash liquid is selectively delivered to a washer nozzle assembly 1020 via fluid connectors 1013 and tubing 1012, the flow between container 1002 and nozzle assembly 1020 being actuable by remotely controlled valving or other suitable means. For example, the means for actuation may be electromechanical in nature whereby the outlet tube 1018 of the canister is mechanically moved to an open or outflow position in response to a remotely transmitted and locally received electrical signal, such an arrangement being described and illustrated in U.S. Pat. No. 8,500,039 (Allen, Jr.) or U.S. Pat. No. 5,531,344 (Winner), the disclosures in which are incorporated herein in their entireties. Alternatively, the remotely generated signal may control an electromagnetic solenoid valve 1010 that selectively permits outflow of the pressurized fluid from the container or canister. The remotely actuable solenoid valve may be of the type located within an aerosol canister for controllably releasing and dispensing a liquid spray, as, for example, disclosed in U.S. Published Patent Application No. 2008/0277501 (Everett et al), the entire disclosure in which is incorporated herein by reference. Alternatively, the solenoid valve or other control means may be disposed external to the canister and arranged to controllably dispense liquid therefrom, as, for example, disclosed in U.S. Pat. No. 5,709,321 (Smrt) and U.S. Pat. No. 6,216,925 (Garon), the entire disclosures in which are incorporated herein by reference. The times and durations of each actuation of the liquid dispenser may be manually selected by the operator or automatically effected at predetermined times of occurrence and/or for predetermined durations.

In the particular example illustrated in FIG. 9, selective remote actuation of the canister to emit and cause the pressurized wash liquid to flow to the nozzle assembly 1020 utilizes solenoid valve 1010 electrically switched on and off by a control circuit 1080. The control circuit includes, or may be electrically connected to a receiver 1070 configured to receive remotely transmitted control signals (e.g., RF signals) from a transmitter 1060. The receiver 1070 and control circuitry 1080 are preferably provided in a single housing to minimize space. The transmitter 1060 may, for example, be located within a passenger compartment of a vehicle such as a car or truck to be selectively actuated by the operator to clean a lens 1040 of a rear view camera typically installed as original equipment on the vehicle. When so used the signal from the transmitter 1060 may be transmitted as an RF signal, or it may be provided as an electrical signal via wiring between the transmitter 1060 and receiver 1070. Alternatively, the transmitter 1060 may be in the hands of a drone operator on the ground to be selectively actuated to clean the lens 1040 of a camera installed on a drone. In any case, when the system is deployed, the nozzle assembly is mounted in an orientation such that it issues a defined spray pattern 1030 generally transversely across the field of view of the camera lens 1040 to be cleaned, as described herein in relation to FIGS. 2 and 3.

The use of camera or image sensor (e.g., LIDAR sensor) wash system 1000 with a drone is illustrated in FIG. 10 wherein a sUAS or drone 800 is illustrated diagrammatically. At present, FAA regulations limit drone use to "line of sight"; however, many operators seek to use drones more autonomously, and the small size and on-command cleaning method made available by the present invention as the drone is in flight and finding its way to its objective make longer flights and autonomous flights possible. The drone-mounted self-contained camera wash system 1000D is configured as illustrated in FIG. 9 and described above to spray wash liquid to cleanse the surface of the external lens 1040D of a drone-mounted camera. The system is preferably activated wirelessly, from a trigger/switch and transmitter 1060 attached to or incorporated in the drone operator's hand-held controller, PDA, tablet or laptop computer used to operate the drone. System 1000D is designed to be small in size and lightweight, and is therefore ideally suited for use on a drone. Importantly, wash fluid supply canister 1002 can be quite small (e.g., typically about 5 ml-25 ml in volume and generally less than 100 ml) because fluidic oscillator nozzle assembly 1020 (FIG. 9) makes optimally efficient use of available wash liquid in effecting its lens cleaning function. More particularly, as described above, the fluidic oscillator spray nozzle issues a laterally oscillating jet of washer liquid which, by virtue of its oscillation, breaks up into a pattern of droplets that uniformly and efficiently strike and cover the target area, in this case camera lens 1040D. The uniformity of droplet coverage permits less liquid to be used per individual lens cleaning event than is required with other types of nozzles (e.g. sheet sprays), which, in turn, reduces the amount of liquid that must be stored in the on board container 1002 in order to permit a practically reasonable number of cleaning events to be effected per drone flight. In addition the canister can be configured for easy replacement as more washing liquid is needed.

Electrical power for operating the control circuitry 1080, receiver 1070 and solenoid 1010 is preferably derived from and electrically connected to the drone onboard batteries, although it is contemplated that for some installations the wash system kit may include a separate battery or other voltage supply. Dispensing of the pressurized washer fluid from the washer liquid container is, as described, under the control of electromagnetic valve 1010 (or the like), which momentarily actuates and opens in response to an actuating signal from controller 1080 which receives a control signal via receiver 1070 initiated by a user with transmitter 1060.

As noted above, the self-contained image sensor (e.g., LIDAR sensor) or camera wash system of the present invention may be configured for the automotive aftermarket for cleaning lenses of original equipment rear view cameras, and the like, on cars, trucks buses, etc. Such a configuration is exemplified in Referring to FIGS. 11 and 12 and includes a larger volume container 1002 (e.g., 750 ml) that is releasably connected and adapted for easy installation and replacement to replenish washer fluid as needed. Specifically, an automobile rear view or back-up camera assembly 1040 is positioned just above the mounting location for a license plate 1100. The self-contained camera wash system 1000A, with its own washer liquid container or reservoir, does not require a driver or vehicle owner to tap into any pre-existing washer reservoir or other components that may be previously installed or part of the original equipment in the vehicle. Rather, the user can simply install or mount the self-contained washer system proximate the existing back up camera assembly 1040A with nozzle 1020A oriented to issue a cleaning spray transversely across the lens. If the self-contained washer system or kit includes, as an option, a battery for operating the electronic controls and solenoid, the washer system can be deployed without connecting it to the vehicle electrical system. If no battery is included with the system or kit, means for connection to the vehicle power (e.g., to the voltage supply power for the back-up or rear view camera) can be provided with the kit, such as electrical connectors configured to tap into the vehicle battery or other voltage supply.

Figure 12:
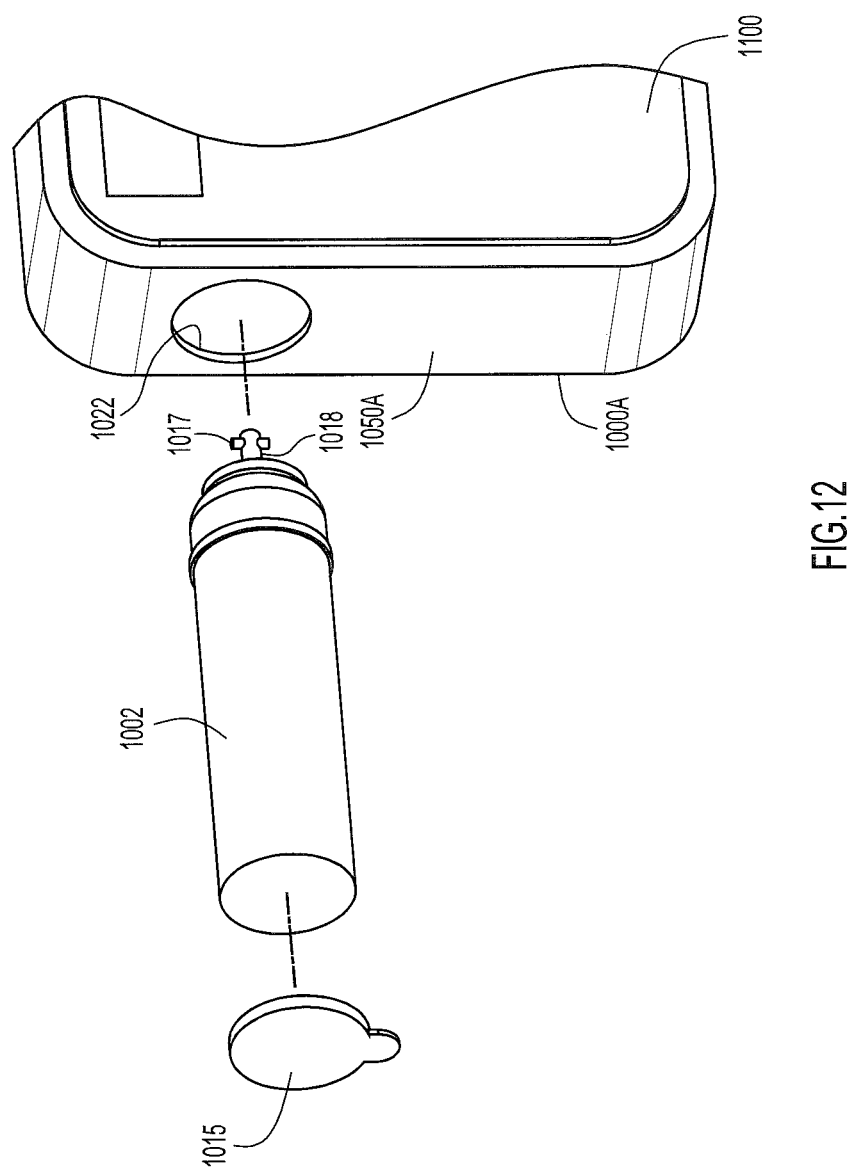
FIG. 12 is an exploded detail view in perspective of a portion of the system shown in FIG. 11.

The self-contained image sensor (e.g., LIDAR sensor) or camera wash system 1000A of FIGS. 11 and 12 is of the type illustrated in FIG. 9 and described above, and is configured to spray wash liquid to cleanse the vehicle external lens surface 1040A. The system is preferably activated wirelessly from trigger/switch 1060 (FIG. 9). System 1000A is shown as being disposed in a housing 1050A attached behind a vehicle license plate 1100. This embodiment employs a number of the features of the camera wash devices illustrated in FIGS. 2-8 but can provided in a smaller package. A replaceable pressurized container 1002 supplies washer fluid to camera wash nozzle 1020A. Container 1002 is, or may be similar to, a common aerosol canister. The replaceable washer fluid supply container 1002 preferably includes a releasably engageable fluid tight connector 1017 with a lumen 1018 that is easily snapped, screwed, or connected, e.g., via a ¼-turn luer-lock motion, or otherwise attached to the system (e.g., at a base mount) so that the average consumer can replace the spent fluid wash containers without difficulty, wasted time or wasted or spilled washer fluid. In this regard, container 1002 may be accessibly received in housing 1050A via an access aperture or opening 1022 defined in a side edge wall of the housing. Access aperture 1022 is selectively covered by a selectively removable closure such as tab or cover member 1015 that, when in place, provides a fluid seal for the aperture by means of a gasket, O-ring, or the like. Cover member 1015 may be pivotably attached to the housing or completely removable therefrom, and may be configured to snap-fit into the aperture. When cover member is open, container 1002 may be grasped by fingers of a user's hand and selectively moved longitudinally and removed through access aperture 1022. A replacement container may then be inserted longitudinally through the aperture until connector 1017 engages connector 1013 (FIG. 9) inside the housing.

The controller 1080 used in the retrofit automotive system 1000A may include a processor with memory and may be programmed to conserve the washing liquid by operating autonomously and self-activating once every twelve hours (or other pre-determined between-wash spray interval) and may be powered by either a small battery to keep time or utilize a capacitor that is periodically connected to accumulate and store charge from the vehicle circuitry (e.g., taking power from the rear view camera circuitry when activated).

The automotive retro-fitted or aftermarket self-contained camera wash system optional wireless (e.g., Bluetooth) transmitter 1060 is actuated by a switch mounted or positioned within a vehicle interior or passenger compartment, optionally near the vehicle internal display used to display the image from camera 1040A. Nozzle 1020 can be mounted remotely from the assembly to cover a wider variety of camera locations, as noted above.

In the license plate mount support embodiment and method illustrated in FIGS. 11 and 12, part or all of the self-contained image sensor or camera wash system's fluid storage and control hardware (e.g., 1002, 1010) is enclosed and protected within housing 1050 which is provided with spaced through bores configured to receive elongated first and second license plate retaining bolts 1023 for installation in a fixture including license plate mounting components. This provides a visually inconspicuous volume behind the license plate 1100, effectively spacing license plate 1100 away from the vehicle by a few centimeters for packaging room. This "behind the license plate" housing 1050A will (for certain car models) provide advantageous positioning of nozzle 1020A since the back-up camera 1040A is often placed near the license plate mount. Energy to operate the wash system's control signal receiving and processing circuitry 1080, the solenoid valve 1010 and related control electronics may be provided from an included battery (not shown) or from a generic power source. The automotive aftermarket self-contained camera wash system components can be incorporated into a single unitary housing or enclosure 1050A, or those components can be configured as two or more assemblies connected via flexible conduits or tubes (e.g., tubing 1020) to be mounted remotely from the fluid supply container assembly which is preferably accessible without requiring removal of the license plate (as described above in connection with access aperture 1022) to provide greater ease when changing fluid containers.

Figure 13:
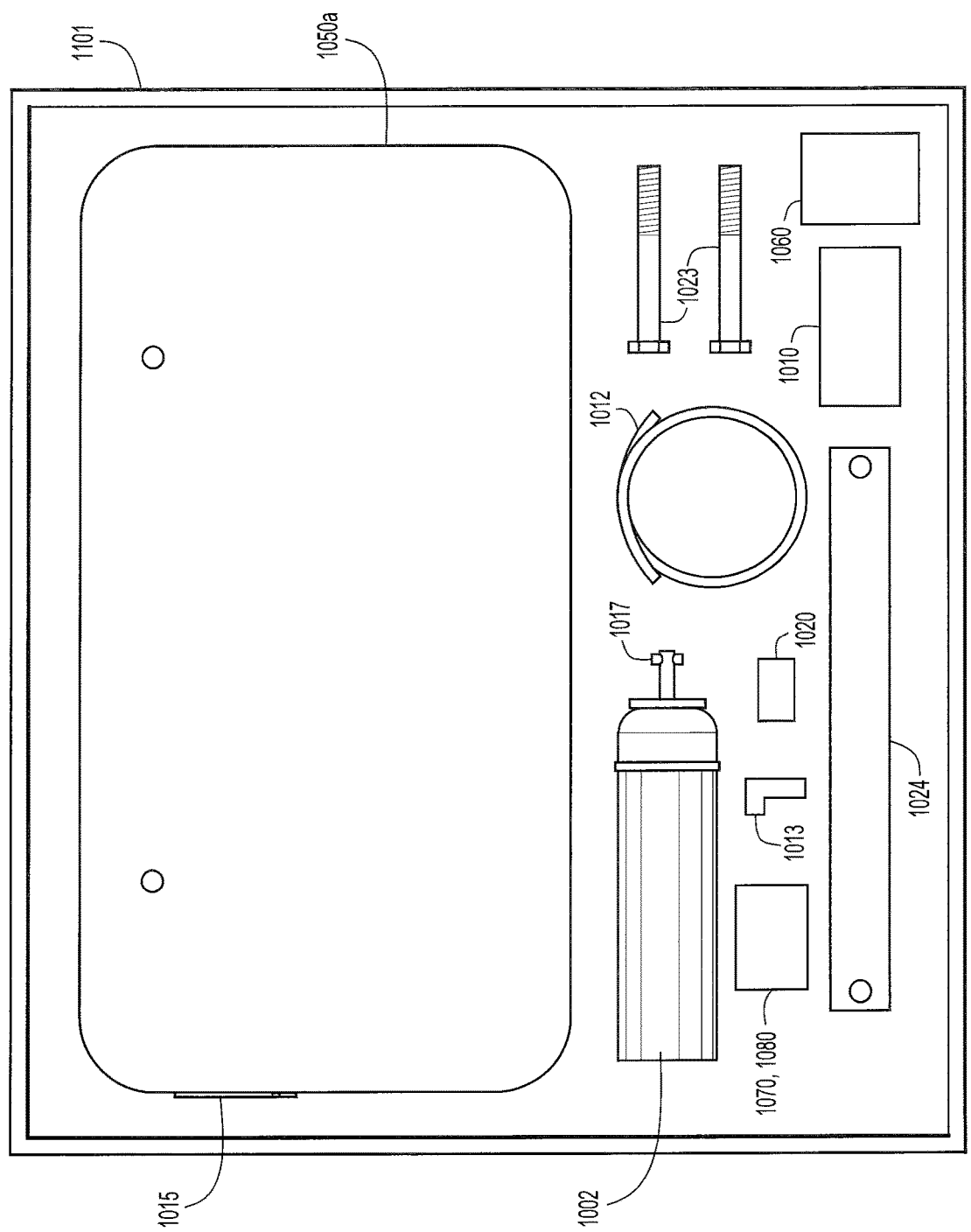
FIG. 13 is a plan view of a kit containing the parts of the self-contained vehicle image sensor or camera wash system of the present invention.

As described above, the self-contained image sensor (e.g., LIDAR sensor) or camera wash system of the present invention may be, and preferably is, provided for consumers in the form of a kit. Such a kit 1101 is illustrated in FIG. 13 and includes fluid container 1002, fluidic oscillator nozzle 1020, solenoid valve 1010, fluid connection tubing 1012 and connectors 1013, housing 1015, transmitter 1060, receiver 1070 and control circuit 1080. A battery may also be included as an optional component. Other optional components that may be included in the kit are instructions describing the method of installing the kit components on the vehicle and instructions describing how to operate the washer system. The instructions may be provided in hard copy printed form or on an electronic storage medium such as a disk, flash drive, etc. The kit may also include miscellaneous hardware for connecting and mounting the system and its components.

The self-contained image sensor (e.g., LIDAR sensor) or camera wash system is described hereinabove for use with drones and automotive products. It will be appreciated that the system also has use in cleaning the lens of substantially any image sensor or camera that, in use, is exposed to dust, dirt and substantially any environmentally existing matter that can reside on the objective lens or external cover surface and obscure or distort its field of view. Examples of such image sensors or cameras include building or utility pole mounted security cameras or image sensors (e.g., LIDAR sensors), speed and traffic light monitoring cameras, etc.

Having described preferred embodiments of new and improved self-contained image sensor or camera wash systems, methods of employing same and kits for providing components for such systems, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A kit for an image sensor or camera lens wash system for selectively cleaning a lens of an image sensor or camera, said kit comprising:
   an actuator;

a receiver configured to receive a remotely generated signal;

a controller configured for electrical connection to said receiver and configured to provide a control signal to said actuator in response to reception at said receiver of said remotely generated signal;

a housing configured to be mounted on the drone vehicle with a removable container of pressurized wash liquid suitable for cleaning camera lenses and said controller disposed interiorly of said housing;

a luer-lock connector inside the housing configured to engage with a releasably engageable fluid tight connector of the removable container in a turn motion, wherein said removable container is an aerosol container that has a liquid storage capacity in the range of 5 ml to 100 ml;

wherein said actuator is configured to selectively release pressurized wash liquid from the removable container in response to said control signal; and a nozzle configured to be connected to receive a pressurized wash liquid that is selectively released from said removable container by said actuator and to issue the pressurized wash liquid in a defined spray pattern;

wherein said nozzle is configured to be mounted in an orientation such that said defined spray pattern is issued across the image sensor or camera lens generally transversely of a field of view of said image sensor or camera lens;

wherein said kit is configured to, when assembled, selectively clean a lens of a camera of a drone vehicle while in-flight.

2. The kit of claim 1 further comprising a transmitter that is selectively actuable to transmit said remotely generated signal for reception by said receiver.

3. The kit of claim 2 further comprising instructions for assembling the kit and for operating the system.

4. The kit of claim 1 wherein said nozzle is a fluidic oscillator nozzle configured to issue an oscillating jet of said pressurized wash liquid, and wherein said defined spray pattern is a fan-like pattern of liquid droplets derived from break up of said oscillating jet.

5. The kit of claim 1 wherein an access opening is defined through a wall of said housing and configured to permit said removable container to be selectively inserted into and removed from said housing, and wherein the kit further comprises a cover member pivotably attached to said housing configured to snap-fit into the access opening and manage access to said removable container.

6. The kit of claim 1 wherein said housing is further configured such that said receiver can be housed therein.

7. The kit of claim 1 further comprising a voltage source for use in operating said receiver and said actuator.

8. The kit of claim 1 further comprising tubing and connections configured to conduct said pressurized wash liquid from said removable container to said nozzle.

9. A camera lens wash system for selectively cleaning a lens of a camera on a drone, said system is assembled from the kit of claim 1.

10. The system of claim 9 wherein said nozzle is a fluidic oscillator nozzle configured to issue an oscillating jet of said pressurized wash liquid, and wherein said defined spray pattern is a fan-like pattern of liquid droplets derived from break up of said oscillating jet.

11. A method of selectively clean a lens of a drone while airborne, said method comprising the steps of:

providing a camera lens wash system assembled from the kit of claim 1;

transmitting a command signal from a ground location to the drone;

receiving said command signal at said drone and releasing a pressurized wash liquid from the removable container;

conducting said pressurized wash liquid to the nozzle; and issuing the defined spray pattern of said pressurized wash liquid from said nozzle transversely across the lens of the drone.

12. The method of claim 11 wherein said nozzle is a fluidic oscillator nozzle, said method including the further step of issuing said defined spray pattern as a pattern of droplets derived from a breaking up of an oscillating jet of the pressurized wash liquid.

* * * * *

UNITED STATES PATENT AND TRADEMARK OFFICE
CERTIFICATE OF CORRECTION

Page 1 of 1

PATENT NO. : 11,529,932 B2
APPLICATION NO. : 16/320139
DATED : December 20, 2022
INVENTOR(S) : Russell Hester It is certified that error appears in the above-identified patent and that said Letters Patent is hereby corrected as shown below:

In the Claims

Column 13, Claim 1 Lines 8 and 11 should be amended as follows:
a housing configured to be mounted on the drone vehicle with at least a removable container and said controller disposed interiorly of said housing;
a connector inside the housing configured to engage with a releasably engageable fluid tight connector of the removable container of pressurized wash liquid for cleaning camera lens in a turn motion, ...

Signed and Sealed this
Tenth Day of September, 2024

Katherine Kelly Vidal
*Director of the United States Patent and Trademark Office*